(12) United States Patent
Thomas et al.

(10) Patent No.: US 10,006,585 B2
(45) Date of Patent: Jun. 26, 2018

(54) FOLDABLE MOUNTING BRACKET FOR PATIO AND DECK ACCESSORIES

(71) Applicants: Lawrence John Thomas, Leesburg, VA (US); Mary Catherine Thomas, Leesburg, VA (US)

(72) Inventors: Lawrence John Thomas, Leesburg, VA (US); Mary Catherine Thomas, Leesburg, VA (US)

( * ) Notice: Subject to any disclaimer, the term of this patent is extended or adjusted under 35 U.S.C. 154(b) by 0 days. days.

(21) Appl. No.: 15/461,355

(22) Filed: Mar. 16, 2017

(65) Prior Publication Data
US 2017/0299115 A1    Oct. 19, 2017

Related U.S. Application Data

(60) Provisional application No. 62/311,564, filed on Mar. 22, 2016.

(51) Int. Cl.
| | | |
|---|---|---|
| *A01K 97/10* | (2006.01) | |
| *A45B 25/28* | (2006.01) | |
| *A47G 25/12* | (2006.01) | |
| *H01Q 1/12* | (2006.01) | |
| *F16M 13/02* | (2006.01) | |
| *E04H 12/22* | (2006.01) | |

(52) U.S. Cl.
CPC ............. *F16M 13/02* (2013.01); *E04H 12/22* (2013.01)

(58) Field of Classification Search
CPC . E04H 12/22; E04H 12/2253; E04H 12/2269; E04H 12/2284

USPC .......... 248/685, 110, 111, 113, 218.4, 219.1, 248/518, 534, 535, 536, 539, 540, 541
See application file for complete search history.

(56) References Cited

U.S. PATENT DOCUMENTS

| | | | | |
|---|---|---|---|---|
| 187,797 | A * | 2/1877 | Altick | A47L 13/512 248/113 |
| 271,733 | A * | 2/1883 | Patee et al. | H01Q 1/1221 248/163.1 |
| 1,314,981 | A * | 9/1919 | Ragland | A47L 13/512 248/113 |
| 1,329,394 | A * | 2/1920 | Fry | A47L 13/512 248/113 |
| 2,543,900 | A * | 3/1951 | Dudley | H01Q 1/1221 248/534 |
| 2,686,029 | A * | 8/1954 | Raymond | E04H 12/32 248/201 |
| 3,802,652 | A * | 4/1974 | Holton, Jr. | A01K 97/10 248/315 |
| 4,479,661 | A * | 10/1984 | Weigl | B62K 21/00 248/513 |

(Continued)

*Primary Examiner* — Terrell L McKinnon
*Assistant Examiner* — Michael D McDuffie

(57) ABSTRACT

A unique foldable mounting bracket assembly for mounting and securing vertically disposed accessories for decks and patios. The folding mounting bracket assembly when supporting vertically disposed cylindrical post requires both an upper and lower bracket. These brackets are mounted to the vertical post. When these brackets are used in conjunction with the railing of a deck the brackets can be mounted to the vertical railing support post below the top railing horizontal support cross member and above the lower support cross member. This unique foldable mounting bracket when not in use stows flat against the vertical support post not protruding out of the envelope of the standard 2"×4" railing horizontal members.

1 Claim, 8 Drawing Sheets

(56) References Cited

U.S. PATENT DOCUMENTS

| | | | | |
|---|---|---|---|---|
| 6,003,826 | A * | 12/1999 | Galloway, III | E04H 12/2238 248/519 |
| 8,950,723 | B1 * | 2/2015 | Fogelstrom | A45B 11/00 135/16 |
| 2005/0263667 | A1 * | 12/2005 | Fisher | B62J 11/00 248/534 |
| 2006/0113455 | A1 * | 6/2006 | Chan | A63B 55/408 248/534 |
| 2007/0034758 | A1 * | 2/2007 | Bates | E04H 12/2276 248/218.4 |
| 2007/0108364 | A1 * | 5/2007 | Metheny | A45B 11/00 248/541 |
| 2011/0036278 | A1 * | 2/2011 | Karl | A47B 57/545 108/147.13 |
| 2012/0168598 | A1 * | 7/2012 | Walker | B60R 7/12 248/539 |
| 2015/0144760 | A1 * | 5/2015 | Paradiso | F21V 21/088 248/535 |
| 2018/0023757 | A1 * | 1/2018 | Baiera | F16M 13/02 |

\* cited by examiner

FOLDABLE MOUNTING BRACKET FOR PATIO AND DECK ACCESSORIES

CROSS-REFERENCE TO RELATED APPLICATIONS

This patent claims the benefits under 35 U.S.C. § 119(e) of prior U.S. Provisional Application No. 62/311,564 filed Mar. 22, 2016

STATEMENT REGARDING FEDERALLY SPONSORED RESEARCH OR DEVELOPMENT

This invention has been created without the sponsorship or funding of any federally sponsored research or development program.

BACKGROUND OF THE INVENTION

1) Field of Invention

This invention relates to a foldable mounting bracket assembly which can be used to secure and support vertically disposed deck and patio accessories. The foldable mounting bracket assembly mounts to a vertically disposed post that supports the deck railing or the like. The vertically disposed deck and patio accessories which can utilize the invention are: umbrellas, flag poles, privacy screens and other items which are attached or utilize a cylindrical vertical pole having a compatible diameter to the vertical cylindrical aperture or through the use of a semi cylindrical taper wedge. One of the unique features of the invention is that when the bracket is not in use, unlike other brackets, this bracket folds flat against the vertically disposed post that supports the deck railing or the like to which the bracket is mounted.

2) Description of the Related Art

There are many types of brackets assemblies that can support various vertically disposed deck or patio accessories. All the current and previous support brackets, when installed, remain in the operational position to either the horizontal railing support or the vertically disposed support post. However the prior art does not fold and limits the support apparatus to remain perpendicular to the mounting surface possibly protruding beyond the envelope of the deck railings. For example see U.S. Pat. No. 8,950,723B1 and U.S. Pat. No. 6,003,826. It is the applicants' belief that while these brackets can support various vertically disposed accessories, these brackets remain perpendicular to their mounting surface and do not fold flat against the mounting surface.

BRIEF SUMMARY OF THE INVENTION

This invention relates to a foldable mounting bracket assembly which can be used to secure and support vertically disposed deck and patio accessories. The foldable mounting bracket assembly when supporting vertically disposed deck or patio accessories requires two brackets mounted to the vertical deck railing support post; one bracket mounted below the upper horizontal railing support member and the second bracket mounted above the lower horizontal railing support member.

DETAILED DESCRIPTION OF THE INVENTION

Figure 1:
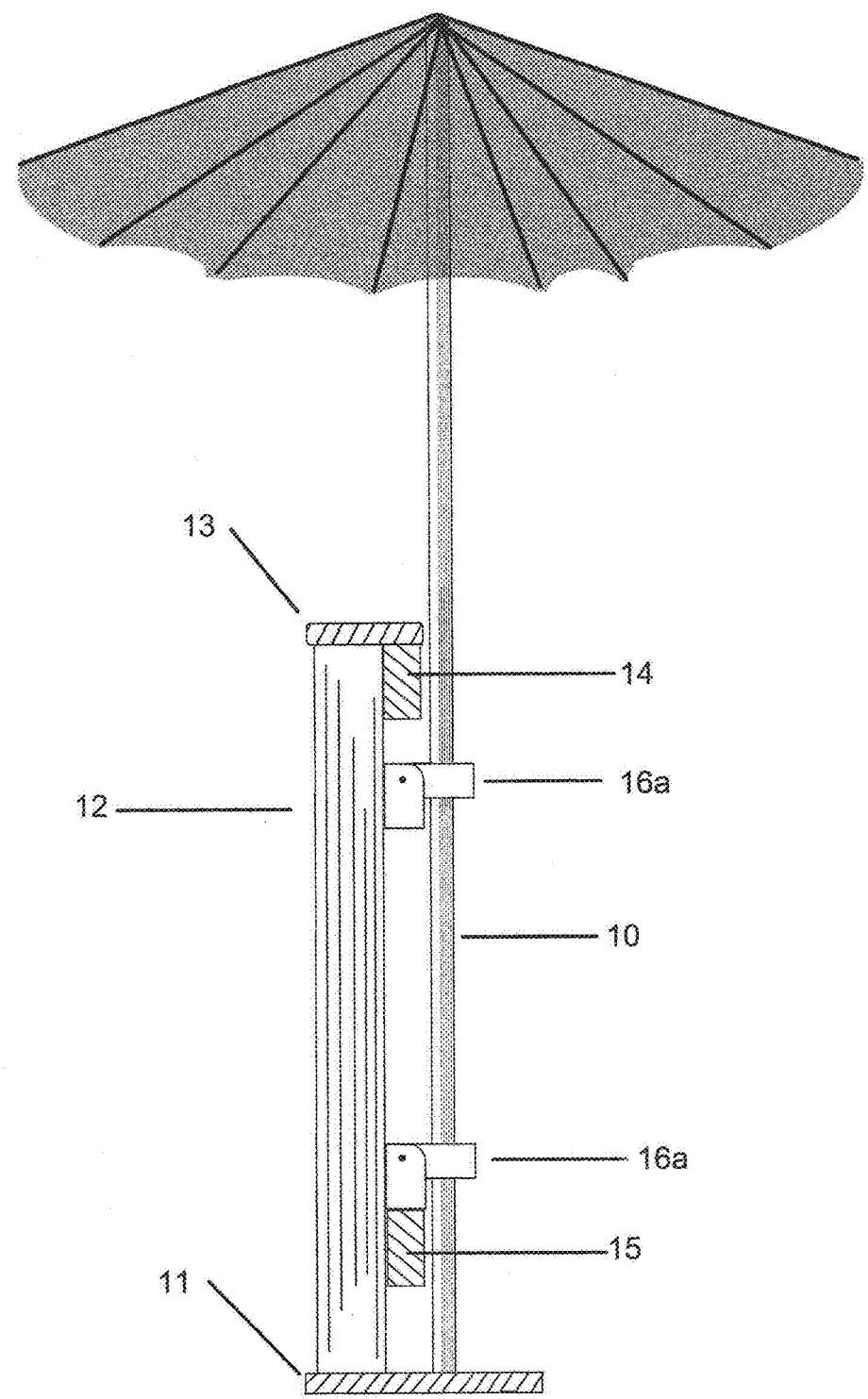
FIG. 1 is a side elevation illustrating the invention deployed in the operational position supporting a cylindrical support member of an accessory.
Figure 2:
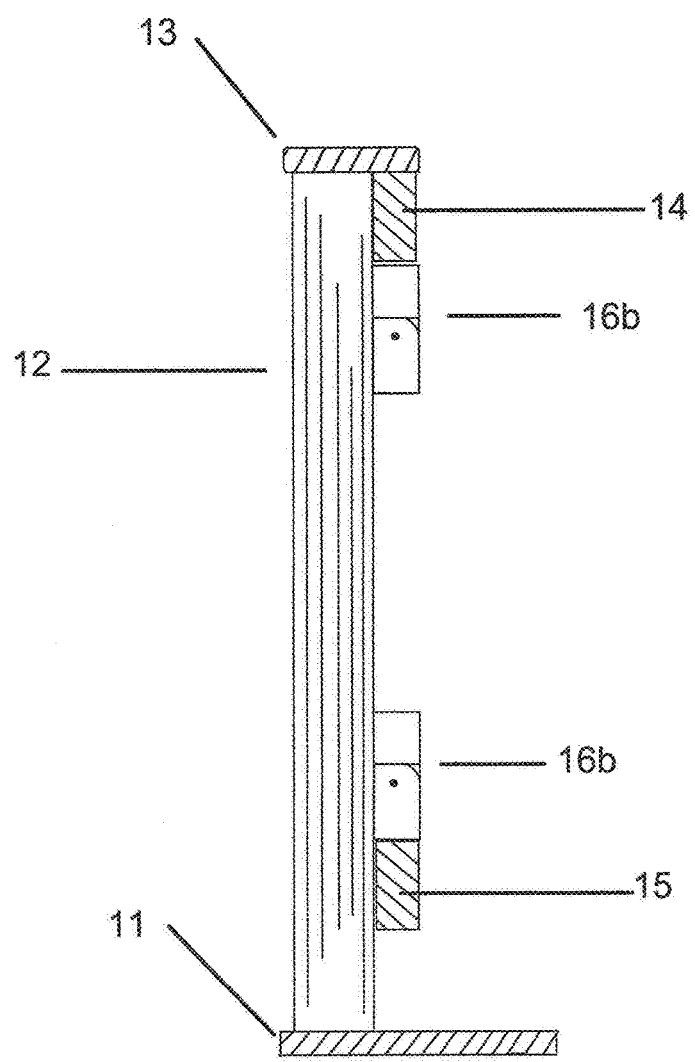
FIG. 2 is a side elevation illustrating the invention in the closed position maintaining and not protruding outside the envelope of the standard 2"×4" horizontal railing.
Figure 3:
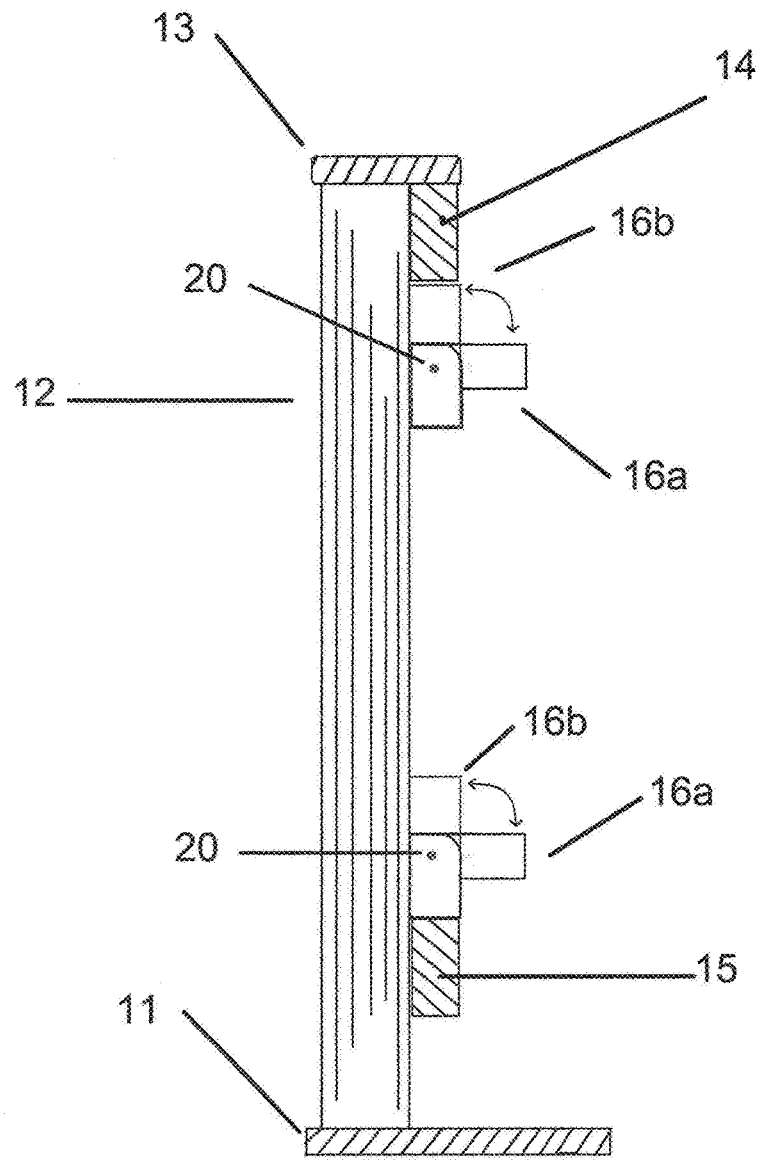
FIG. 3 is a side elevation illustrating the mounting bracket exhibiting the pivot axis of the invention mounted on the deck railing support post.
Figure 4:
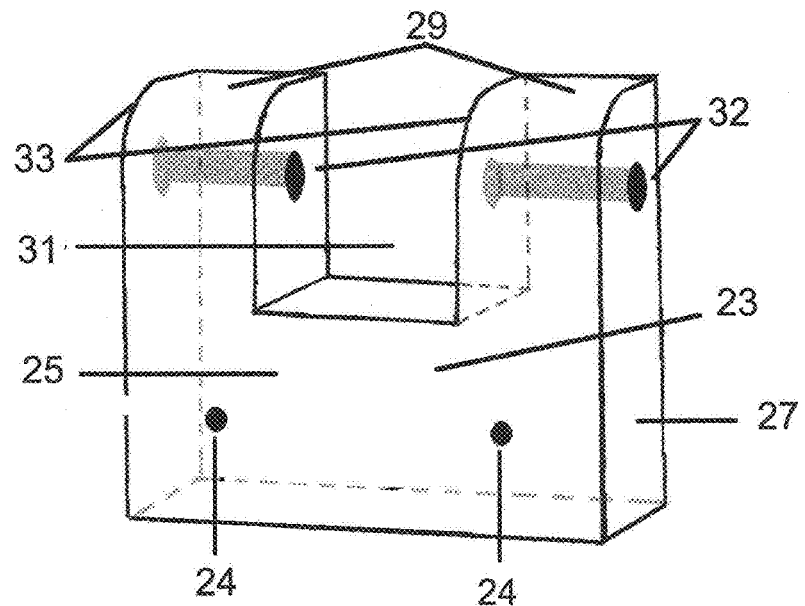
FIG. 4 is an isometric view of the front side of the base portion of the foldable mounting bracket
Figure 5:
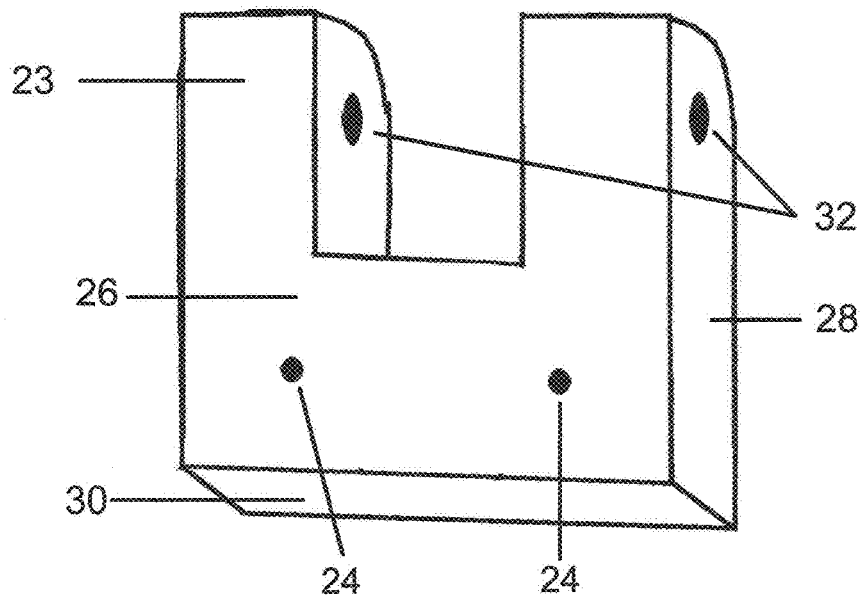
FIG. 5 is an isometric view of the back side of the base portion of the foldable mounting bracket
Figure 6:
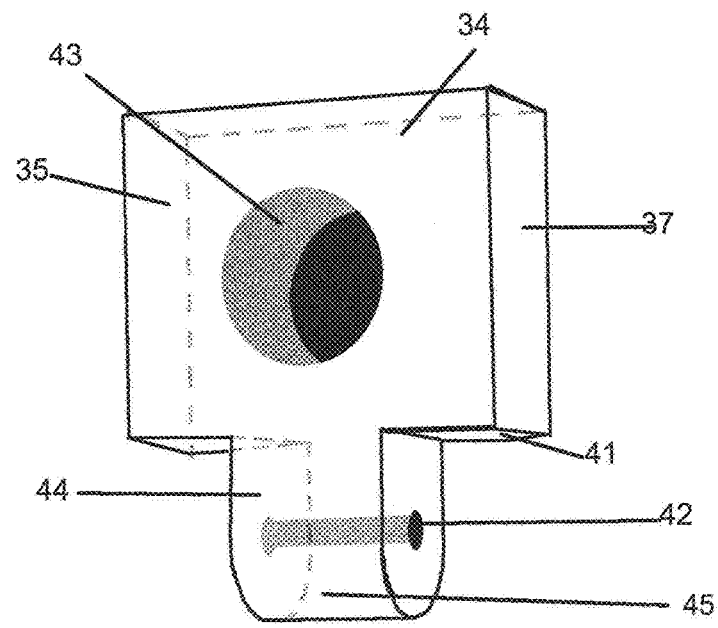
FIG. 6 is an isometric view of the front side of the upper rotating mount portion of the foldable mounting bracket
Figure 7:
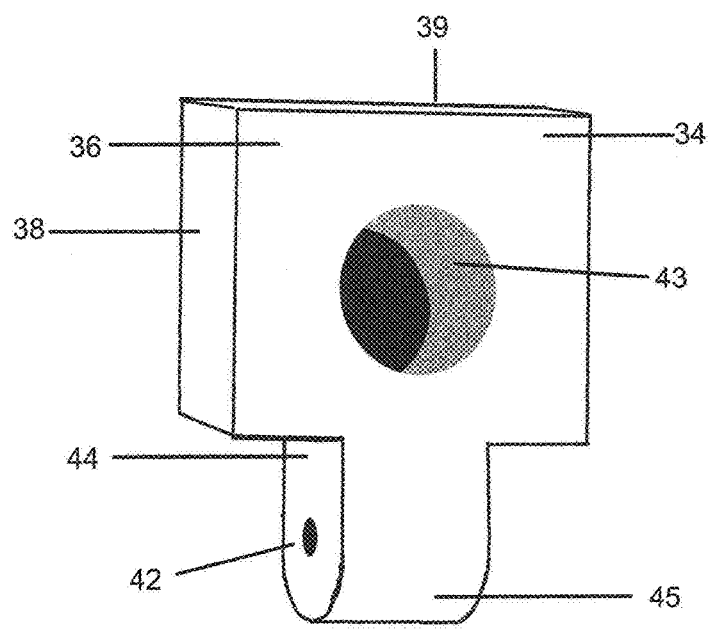
FIG. 7 is an isometric view of the back side of the upper rotating mount portion of the foldable mounting bracket
Figure 8:
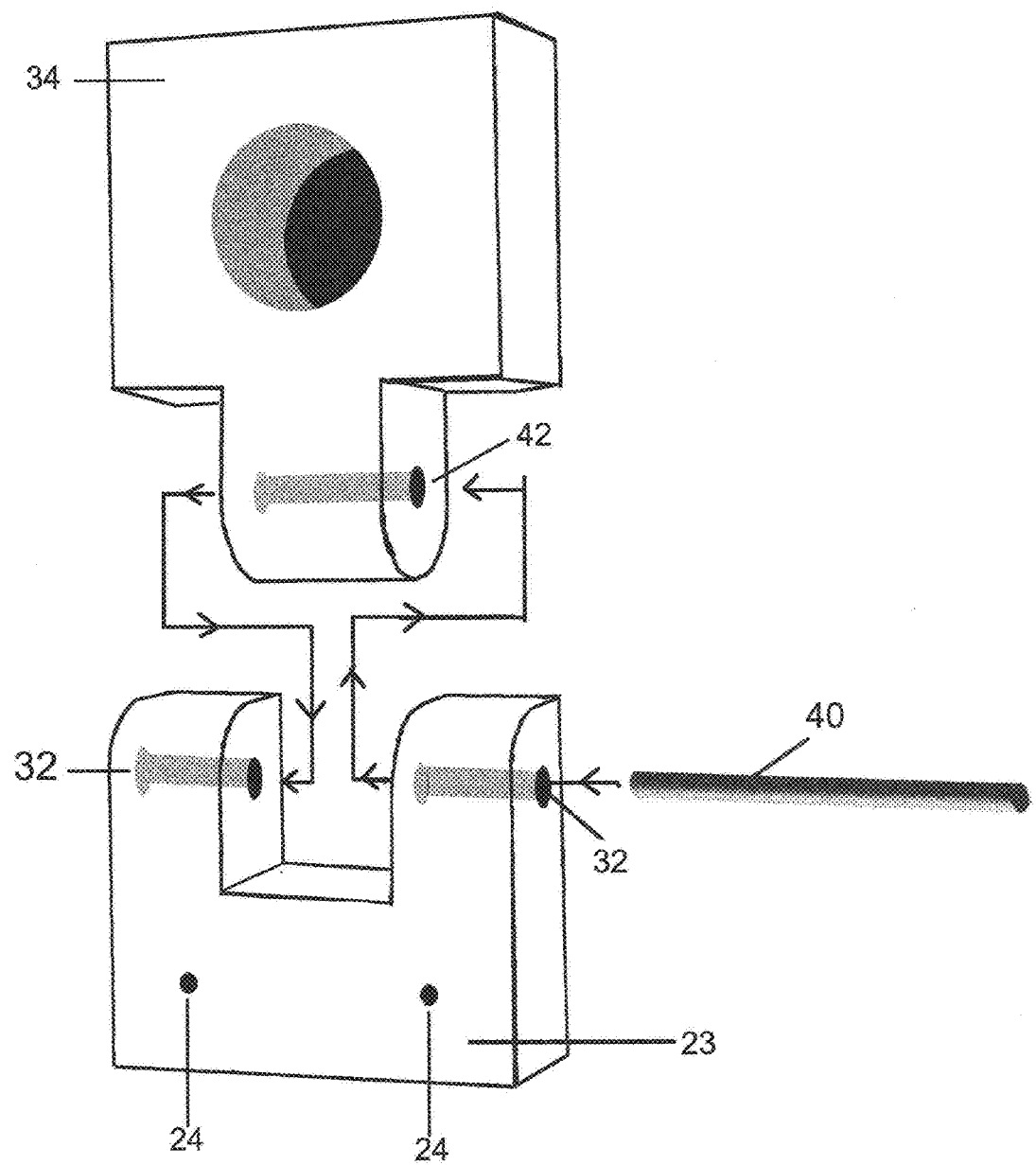
FIG. 8 is an exploded view of the foldable mounting bracket
Figure 9:
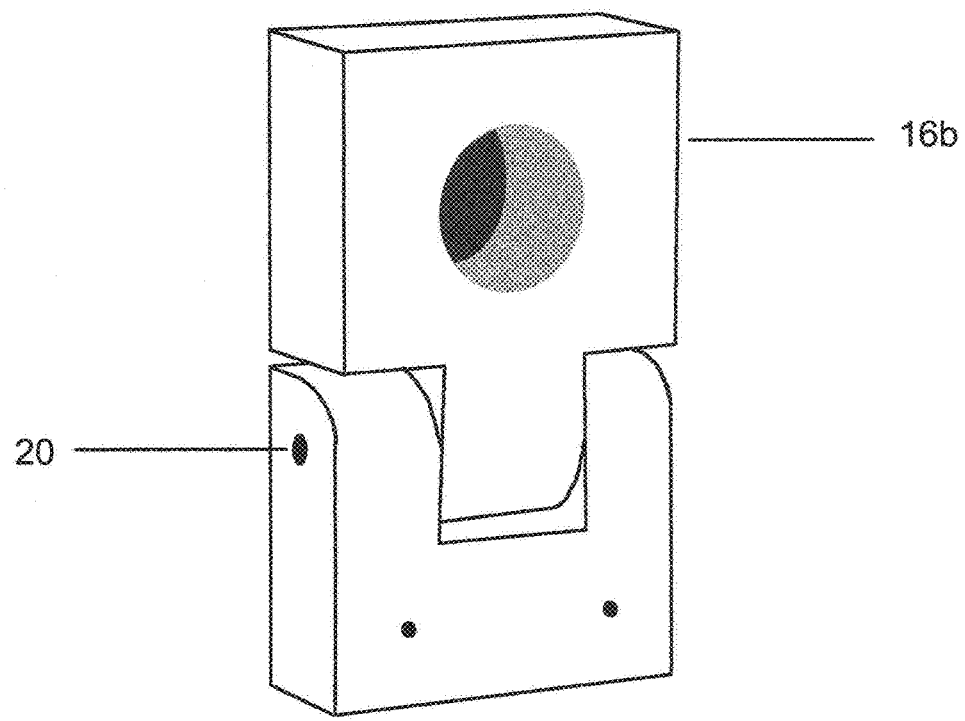
FIG. 9 is an isometric view of the mounting bracket in the closed position.
Figure 10:
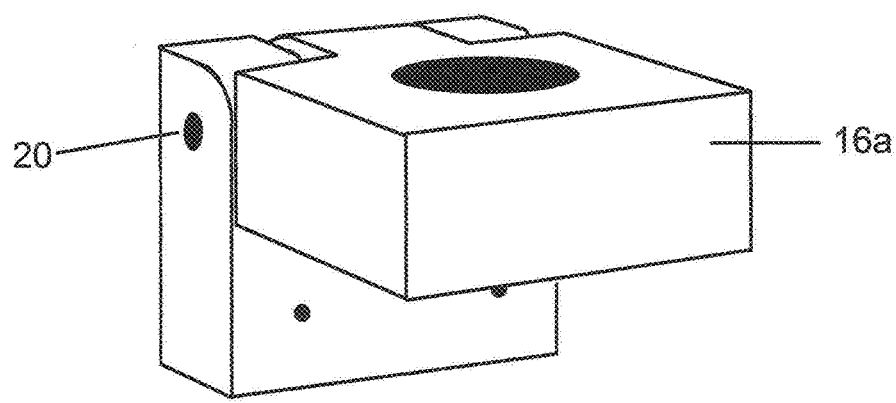
FIG. 10 is an isometric view of the mounting bracket in the deployed position.
Figure 11:
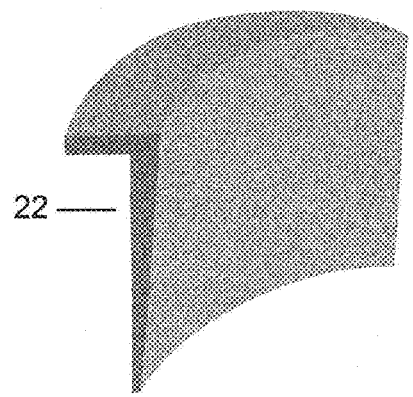
FIG. 11 is an isometric view of the semi cylindrical locking wedge
Figure 12:
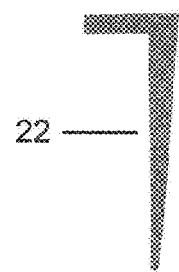
FIG. 12 is a side elevation of the semi cylindrical locking wedge
Figure 13:
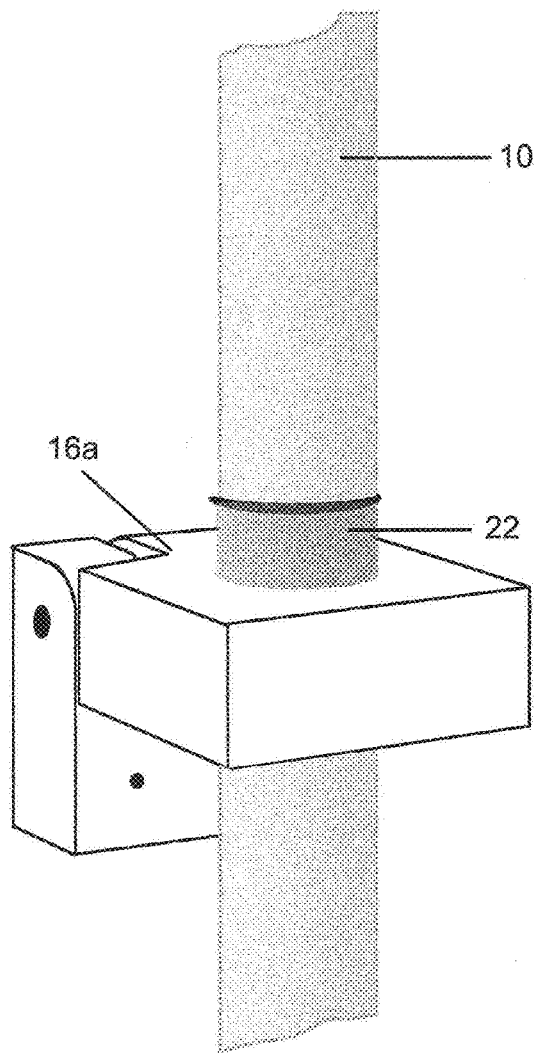
FIG. 13 is an isometric view of a vertically disposed cylindrical post utilizing the semi cylindrical taper wedge

The following FIGS describe the invention with numerical references. Numerical references to specific parts remain the same throughout the different FIGS. Referring first to FIG. 1 the foldable mounting bracket assembly, the invention, can support various accessories as indicated by numerical reference 10. In FIG. 1, FIG. 2, and FIG. 3 the support floor is numerical reference 11, the deck or patio vertical railing support post is numerical reference 12, the top railing cap is numerical reference 13 and the railing horizontal support members are numerical references 14 and 15. Referring to FIG. 1 numerical reference 16a depicts the upper and lower Foldable mounting brackets assembly in the deployed position. The vertical cylindrical disposed support member is numerical reference 10. In FIG. 2, the foldable mounting bracket in the closed position is shown as numerical reference 16b and in FIG. 3 the foldable mounting bracket assembly rotating axis is numerical reference 20 and the deployed foldable mounting bracket is shown as numerical reference 16a. In FIG. 4 the foldable mounting bracket base portion is numerical reference 23, the aperture for fastening the base to the vertical deck railing support post is numerical reference 24 and the horizontal bore for inserting the knuckle or pivot pin numerical reference 32. The base portion has a front side numerical reference 25, a right side numerical reference 27, an upper side numerical reference 29, with a radius, numerical reference 33, that interfaces the top, numerical reference 29, to the front side, numerical reference 25, and numerical reference 31 is the double eye section or female section of a knuckle joint. In FIG. 5 the foldable mounting bracket base portion has a back side numerical reference 26, a left side numerical reference 28, and an under side numerical reference 30. In FIG. 6 the rotating mounting portion is numerical reference 34, the cylindrical aperture for mounting the vertically and horizontally disposed accessory is numerical reference 43. The rotating mounting portion has a front side numerical reference 35, a right side numerical reference 37 and an underside numerical reference 41. In FIG. 7 the rotating mounting portion has backside numerical reference 36, a left side numerical reference 38 and numerical reference 39 is the top side. In FIG. 6 and FIG. 7 numerical reference 44 is the single eye or male section of the knuckle joint which has a horizontal bore, numerical reference 42, and a continuous radius, numerical reference 45, at the underside connecting the front side numerical reference 35 to numerical reference 36. FIG. 8 illustrates the assembly of the base portion, numerical reference 23, to the rotating mounting portion, numerical reference 34, utilizing the knuckle or pivot pin, numerical reference 40 which provides the rotation of the foldable mounting bracket. In FIG. 9 and FIG. 10 numerical reference 20 is the rotating axis that opens the foldable mounting bracket assembly from the closed position, numerical reference 16b in FIG. 9, to the deployed or open position, numerical reference 16a in FIG. 10. In FIG. 11 and FIG. 12 the depiction of the semi cylindrical tapered wedge is numerical reference 22. In FIG. 13 the foldable mounting bracket in the deployed position is numerical reference 16a, supporting a vertically disposed cylindrical accessory post utilizing the semi cylindrical tapered wedge, compensating for the various diameters of the vertically disposed accessory support posts.

In FIG. 2 the foldable mounting bracket assembly is mounted to the vertically disposed support post. In this configuration the mounting bracket is closed and the mounting bracket assembly. FIG. 9, is parallel to the support post. In FIG. 3 the foldable mounting bracket assembly is mounted to the vertically disposed support post. In this configuration the mounting bracket. FIG. 10, is deployed and the base is parallel to vertically disposed support post and the mounting head is perpendicular to the base and the vertically disposed support post as well as parallel to the deck or the ground. In FIG. 4 item 23 is the base of the bracket assembly and item 24 depicts the apertures for fastening the base to the vertical deck railing support post. The mounting of the bracket assembly to the vertical deck railing support post is accomplished through the use of a variety of fasteners.

What is claimed:

1. A foldable mounting bracket assembly for mounting to a vertically disposed deck or patio accessory, said foldable mounting bracket comprising:

a) a base portion for fastening said foldable mounting bracket to said vertical deck railing support post and said base portion utilizes a double eye section or female section of a knuckle joint having a horizontal bore through said double eye section for the horizontally mounted knuckle or pivot pin which interfaces said base portion to an upper rotating mounting head;
b) said upper rotating mounting head with a vertical circular aperture for mounting said deck or patio accessory and said upper rotating mounting head utilizes a single eye or the male section of the knuckle joint having a horizontal bore through said single eye or male section of the knuckle joint for said horizontally mounted knuckle or pivot pin which interfaces said upper rotating mounting head to said base portion;
c) said horizontally mounted knuckle or pivot pin which connects said base portion to said upper rotating mounting head and facilitates the 90° rotation from the closed position which is parallel to said vertical mounting post to the deployed position which is perpendicular to said railings vertical mounting post as well as parallel to the deck surface;
d) and further comprising a semi cylindrical tapered wedge which stabilizes and secures said vertically disposed deck or patio accessories support post;
e) said base portion of said mounting bracket has two circular apertures for receiving fasteners for attaching said mounting bracket to said vertical mounting post;
f) said base portion of said mounting bracket's front side and back side are parallel to said vertically disposed support post when installed;
g) said cylindrical wedge has an outer radius that is slightly smaller than the radius of the circular aperture for mounting the deck or patio accessory;
h) said cylindrical wedge outer radius is parallel to the radius of said circular aperture and when not in use said wedge can be stored in said circular aperture;
i) said semi cylindrical tapered wedge stabilizes said vertically disposed deck or patio accessory support post; and
j) said cylindrical wedge has an inner radius and is tapered from the top to the bottom for securing various diameter accessory support posts.

* * * * *